United States Patent [19]

Lienert et al.

[11] Patent Number: 5,141,818

[45] Date of Patent: Aug. 25, 1992

[54] PROCESS FOR COATING METAL STRIP IN THE COIL COATING PROCESS USING COATING MATERIALS BASED ON POLYESTER IMIDE RESINS

[75] Inventors: Klaus-Wilhelm Lienert, Hamburg; Arno Schmitz, Nottuln; Peter E. Kunze, Drensteinfurt, all of Fed. Rep. of Germany

[73] Assignee: BASF Lacke & Farben AG, Münster, Fed. Rep. of Germany

[21] Appl. No.: 445,848

[22] Filed: Nov. 22, 1989

[30] Foreign Application Priority Data

May 25, 1987 [DE] Fed. Rep. of Germany ....... 3717596

[51] Int. Cl.$^5$ .............................................. B32B 15/08
[52] U.S. Cl. ................................. 428/458; 427/178; 427/379; 427/388.2; 427/409
[58] Field of Search .................... 427/409, 388.1, 379, 427/178, 116, 388.2; 428/458, 379, 380

[56] References Cited

U.S. PATENT DOCUMENTS

| | | | |
|---|---|---|---|
| 3,944,706 | 3/1976 | Czajka | 427/116 |
| 4,012,555 | 3/1977 | Keske | 428/458 |
| 4,012,556 | 3/1977 | Keske et al. | 427/116 |
| 4,102,869 | 7/1978 | Tobias et al. | 427/178 |
| 4,107,355 | 8/1978 | Merchant et al. | 427/120 |
| 4,170,684 | 10/1979 | Schmidt et al. | 427/388.1 |
| 4,239,814 | 12/1980 | Nagel | 427/118 |
| 4,243,778 | 1/1981 | Heim et al. | 427/116 |
| 4,329,397 | 5/1982 | Zamek | 428/379 |
| 4,397,989 | 8/1983 | Adesko | 427/409 |
| 4,476,279 | 10/1984 | McGregor | 427/120 |
| 4,485,127 | 11/1984 | Pauze | 427/117 |
| 4,508,779 | 4/1985 | Miyake et al. | 428/379 |
| 4,525,427 | 6/1985 | Bayha et al. | 427/388.1 |
| 4,606,947 | 8/1986 | Heinrich et al. | 427/388.1 |
| 4,609,702 | 9/1986 | Zamek | 524/317 |
| 4,725,661 | 2/1988 | Miyabayashi | 427/388.1 |
| 5,084,304 | 1/1992 | Lienert et al. | 427/409 |

FOREIGN PATENT DOCUMENTS 2311831 12/1976 France.

*Primary Examiner*—Michael Lusignan
*Assistant Examiner*—Diana L. Dudash
*Attorney, Agent, or Firm*—Kenyon & Kenyon

[57] ABSTRACT

The invention relates to a process for coating metal strip in the coil coating process. The coating materials employed consist of:

a) 3 to 50% by weight, preferably 20 to 40% by weight, of polyester imide resins, the 20 to 60% by weight solutions of which possess viscosities from 90 to 4,000 mPas at 23° C. and the hydroxyl values of which are in the region from 50 to 300, b) 3 to 40% by weight, preferably 10 to 30% by weight, of pigments and/or fillers, c) up to 3% by weight of suitable auxiliary substances and additives and d) 10 to 90% by weight, preferably 20 to 60% by weight, of one or more organic solvents, the sum of a), b), c) and d) being 100% by weight. The invention further relates to the use of the metal strip produced by the process according to the invention for production of exhaust components.

11 Claims, No Drawings

PROCESS FOR COATING METAL STRIP IN THE COIL COATING PROCESS USING COATING MATERIALS BASED ON POLYESTER IMIDE RESINS

The invention relates to a process for coating metal strip in the coil coating process using coating materials based on polyester resins.

Suitable binders for the coil coating process are, for example, hydroxyl group-containing polyester resins which can be cured with aminoplast resins.

High temperature-resistant systems such as, for example, silicone resins, polyester imide resins, polyimide resins, polyamide imide resins, polyhydantoins, polybismaleimides, polyether sulfones and others are known. Depending on their chemical composition, these binders find application as coating materials for electronic components, coils, electrical conductors, structural components exposed to particularly high temperatures, such as exhaust fans, piping, installations in district heating plants etc. Coating using these coating materials is performed by various techniques, such as, for example, spraying, injection molding, dipping, brushing etc. The shortcomings of these application techniques are high solvent emission and/or necessarily long baking periods.

EP-A-176,251 discloses high temperature-resistant paints based on silicone resins. These paints are, however, unsuitable for the painting of motor car exhausts. In the painting of exhausts, the need is not only for high-temperature resistance but also for impact and water resistance as well as resistance to salt and corrosive exhaust gases. Moreover, the coating of exhausts by conventional techniques using silicone resins is costly and the baking periods are prolonged.

The object of the invention is to develop a process for coating metal strip in the coil coating process which is particularly suitable for coating components exposed to high temperatures, such as exhausts, silencers etc. The resultant coatings should therefore possess good high temperature resistance, good impact and water resistance as well as good resistance to salt, gasoline, oil and corrosive exhaust gases. The requirements are in particular for a satisfactory long-term temperature resistance and an excellent corrosion resistance. In addition, the resultant coatings should possess good substrate and intercoat adhesion as well as good mechanical deformation characteristics, and the required baking periods should be as short as possible.

The object of the invention is achieved by the process outlined at the outset, wherein the coating materials consist of a) 3 to 50% by weight, preferably 20 to 40% by weight, of polyester imide resins obtained from polybasic carboxylic acids or their derivatives, from polyhydric alcohols, optionally from hydroxycarboxylic acids or their derivatives, and from imide group-containing starting materials which consist of such compounds which contain between the functional groups as connecting links one or more five-membered imide rings derived from the reaction of pyromellitic dianhydride, trimellitic anhydride, naphthalenetetracarboxylic dianhydrides or tetracarboxylic dianhydrides with two benzene nuclei per molecule in which the carboxylic groups are located in the 3,3', 4,4' positions, with poly-functional primary amines, 20 to 60% by weight solutions of the polyester imides possessing viscosities in the range from 90 to 4,000 mPas at 23° C. and the hydroxyl values of the polyester imides being in the range from 50 to 300 mg of KOH/g, b) 3 to 40% by weight, preferably 10 to 30% by weight of pigments and/or fillers, c) up to 3% by weight of suitable auxiliary substances and additives, and d) 10 to 90% by weight, preferably 20 to 60% by weight, of one or more organic solvents, the sum of a), b), c) and d) being 100% by weight and the curing of the metal strip taking place at object temperatures from 200° to 350° C. for 30 to 120 seconds in the presence of suitable catalysts.

The polyester imide resins used as the component a) are known and described, for example, in German Offenlegungsschriften 1,445,263 and 1,495,100. The preparation of the polyester imides is carried out in a known manner by esterifying polybasic carboxylic acids with polyhydric alcohols, optionally with the addition of hydroxycarboxylic acids, and by resorting to imide group-containing starting materials. Instead of the free acids and/or alcohols it is also possible to use their reactive derivatives. Terephthalic acid is preferably used as the carboxylic acid component and ethylene glycol, glyceral and tris-2-hydroxyethyl isocyanurate are preferred as the polyhydric alcohols, the last named being particularly preferred. Using tris-2-hydroxyethyl isocyanurate raises the softening temperature of the resultant paint film.

The imide group-containing starting materials can be obtained by a reaction between compounds of which one must possess a five-membered cyclic carboxylic anhydride group besides at least one other functional group, while the other contains, in addition to a primary amino group, at least one other functional group. These further functional groups are in particular carboxyl or hydroxyl groups, but may well be further primary amino groups or carboxylic anhydride groups.

Examples of compounds having a cyclic carboxylic anhydride group with a further functional group are in particular pyromellitic anhydride and trimellitic anhydride. However, other aromatic carboxylic anhydrides fall under this heading, for example naphthalenetetracarboxylic dianhydrides or tetracarboxylic dianhydrides with two benzene nuclei in the molecule in which the carboxylic groups are located in the 3,3',4 and 4' positions.

Examples of compounds with a primary amino group and a further functional group are in particular diprimary diamines, for example ethylenediamine, tetramethylenediamine, hexamethylenediamine, nonamethylenediamine and other aliphatic diprimary diamines. Also suitable are aromatic diprimary diamines, such as benzidine, diaminodiphenylmethane, diaminodiphenyl ketone, diaminodiphenyl sulfone, diaminodiphenyl sulfoxide, diaminodiphenyl ether and diaminodiphenyl thioether, phenylenediamines, toluylenediamines, xylylenediamines as well as diamines with three benzene nuclei in the molecule, such as bis-(4-aminophenyl)-α,α'-p-xylene or bis-(4-aminophenoxy)-1,4-benzene, and finally cycloaliphatic diamines, such as 4,4'-dicyclohexylmethanediamine. Aminoalcohols can also be used as amino group-containing compounds having a further functional group, for example monoethanolamine or monopropanolamine, furthermore aminocarboxylic acids such as glycine, aminopropionic acids, aminocaproic acids or aminobenzoic acids.

Known transesterification catalysts are used for the preparation of the polyester imide resins, for example heavy metal salts such as lead acetate, zinc acetate, furthermore butyl titanate, cerium compounds as well as organic acids, such as, for example, p-toluenesulfonic acid. The same transesterification catalysts can be used as crosslinking catalysts for the curing of the polyester imides, expediently in a proportion of 3% by weight based on the binder.

Suitable pigments and/or fillers (component b) are strontium chromate, zinc chromate, lead chromate, zinc powder, zinc phosphate, metallic pigments such as, for example, aluminum, titanium, steel, and the like.

Examples of suitable auxiliary substances and additives are silicone oils, waxes, silicates and pyrogenic salicylic acids.

Linear and/or cyclic aliphatic and/or aromatic hydrocarbons, ethers, esters, alcohols, amides, phenols and cresols can be used as organic solvents. Aromatic hydrocarbons, N-methylpyrrolidone, N,N-dimethylformamide, N,N-dimethylacetamide, cresols and glycol ethers are preferred.

To prepare the coating materials, the individual components are mixed, binders being first dissolved in the solvent or mixture of solvents. If other insoluble components, such as pigments, fillers, additives and the like are added to the coating materials, they can either be added to the solution or, if required, they can be dispersed using dispersion equipment conventionally employed in the paint industry.

The process according to the invention comprises a one-coat or two-coat operation, i.e. either only a single coat can be applied or the coating consists of a primer and a topcoat, both of which are applied by the coil coating process. The object of the invention is in particular a process in which a primer consisting of the coating material produced from the components a) to d) with a dry film thickness from 4 to 15 μm, preferably from 5 to 10 μm is first applied, and, after the primer has been cured, a topcoat consisting of the coating material produced from the components a) to d) with a dry film thickness of 5 to 23 μm, preferably 10 to 19 μm, is applied. In this multicoat process, the coating material used as the primer preferably contains anticorrosive pigments such as, for example, strontium chromate, zinc chromate, lead chromate, zinc powder and zinc phosphate. The coating material used as the topcoat preferably contains metallic pigments such as, for example, aluminum, titanium and steel.

The coated metal strip produced in accordance with the invention is preferably employed for the production of components exposed to high temperatures, such as exhaust parts, foul air pipes, stove and radiator surfacings and grills.

The coatings obtained are distinguished from conventional exhaust coatings by their short baking period, by their good deformation characteristics, by their resistance to water, salt, gasoline, oil, brake fluid, impact and exhaust gases, by offering good protection against corrosion and by being free from problems associated with substrate and/or intercoat adhesion. In addition, there is the advantage that the watering agents used have excellent storge stability.

The invention is elucidated in greater detail by application examples below. In these examples all percentages are percentages by weight and all parts are parts by weight.

| Preparation of the polyester imides 1, 2 and 3: | | | |
|---|---|---|---|
| | Polyester imide 1 | Polyester imide 2 | Polyester imide 3 |
| Ethylene glycol | 14.6 | 36.9 | 28.1 |
| Glycerol | — | 5.1 | — |
| Trishydroxyethyl 2-isocyanurate | 23.9 | — | — |
| Dimethyl terephthalate | 20.5 | 17.4 | 9.1 |
| 4,4'-Diaminodiphenyl-methane | 13.9 | 13.7 | 14.6 |
| Trimellitic anhydride | 27.1 | 26.9 | 48.2 |
| Solvent | Methyl diglycol-Solvesso (4:1) | Cresol-Solvesso (2:1) | Cresol-Solvesso (2:1) |
| Solids (%) | 48 | 38 | 35 |
| Viscosity (mPas) | 360–400 | 470–530 | 450–550 |
| OH value (mg of KOH/g) | 75–100 | 140–160 | 165–200 |

EXAMPLE 1

PRIMER 1

A primer is prepared from 67.1 g of a 45% solution of the polyester imide 1, 29.7 g of zinc powder, 0.12 g of an aluminum silicate, 0.2 g of a Teflon powder, 1.9 g of tetralin and 0.3 g of a silicone-containing film-former, using dissolvers. The solids content is 61%. DIN 4 efflux time is 91 seconds.

EXAMPLE 2

PRIMER 2

A primer is prepared by dispersing 71.4 g of polyester imide 2 (38% solution), 32.3 g of zinc powder, 0.4 g of an aluminum silicate, 0.2 g of a Teflon powder and 2.0 g of a silicone-containing film-former. DIN 4 efflux time is 110 seconds at a solids content of 56.5%.

EXAMPLE 3

PRIMER 3

A primer is prepared by dispersing 70.2 g of a 35% solution of the polyester imide 3, 27.3 g of zinc powder, 0.3 g of an aluminum silicate, 0.2 g of a Teflon powder, 1.8 g of tetralin and 0.2 g of a flash-off agent. The paint has a solids content of 52% with an efflux time (DIN 4) of 108 seconds.

EXAMPLE 4

TOPCOAT 1

14.3 g of aluminum powder or aluminum flakes and 14.3 g of Solvesso 150 (Esso) are formed into a paste to which 71.4 g of the solution (45%) of polyester imide 1 are added. The resultant paint has a solids content of 46% and an efflux time (DIN 4) of 97 seconds.

EXAMPLE 5

TOPCOAT 2

12.1 g of aluminum powder or aluminum flakes, 9.1 g of N-methylpyrrolidone and 6.4 g of benzyl alcohol are formed into a paste to which 70.7 g of polyester imide 2 in the form of a 39% solution and 1.6 g of a poly-n-butyl acrylate in the form of a 10% solution in Solvesso 150 (Esso) as film former are added. The finished paint has a solids content of 40% and an efflux time (DIN 4) of 84 seconds.

EXAMPLE 6

TOPCOAT 3

A topcoat is formulated from 7.5 g of aluminum powder or aluminum flakes, 17.2 g of propylene carbonate and 54.3 g of polyester imide 3 (35% solution); it has a solids content of 33.5% and an efflux time (DIN 4) of 72 seconds.

To the primers 1 to 3 and the topcoats 1 to 3 0.8% by weight, based on the binder solids, of an transesterification catalyst is added.

The tests of the coatings obtained in the coil coating process are carried out in accordance with the corresponding ECCA procedures. The results are listed below as follows:

|  | Substrate | | | | |
| --- | --- | --- | --- | --- | --- |
|  | Allodine 1200 | | | Allodine 1200 | |
| Primer | — | — | — | 1 | 2 |
| Baking period (s) | 120 | 120 | 120 | 120 | 120 |
| Object temperature (°C.) | 289 | 289 | 289 | 289 | 289 |
| Film thickness (μm) (dry) | — | — | — | 10 | 9 |
| Topcoat* | 1 | 2 | 3 | 1 | 1 |
| Total film thickness (μm) (dry) | 17 | 14 | 16 | 28 | 27 |
| Pencil hardness | H | H | F | H | H |
| Buchholz hardness | 141 | — | — | 152 | 160 |
| MEK double rubbing test | >100 | >100 | >100 | >100 | >100 |
| Tape test | 2.0/0 | 2.0/0 | 1.5/0 | 1.5/0 | 2.0/0 |
| Aging (180° C., 30 min.) | 2.0/0 | 2.0/0 | 1.5/0 | 1.5/0 | 2.0/0 |
| Surface Coin test | good | good | good | good | good |
| substrate adhesion | v.good | v.good | v.good | v.good | v.good |
| intercoat adhesion | — | — | — | v.good | v.good |

|  | Substrate | | | | |
| --- | --- | --- | --- | --- | --- |
|  | Allodine 1200 | Bonder 901 | Granodine C 108 | Allodine 1200 | |
| Primer | 3 | 1 | 1 | — | — |
| Baking period (s) | 120 | 120 | 120 | 60 | 90 |
| Object temperature (°C.) | 289 | 277 | 277 | 244 | 274 |
| Film thickness (μm) (dry) | 10 | 9 | 9 | — | — |
| Topcoat* | 1 | 1 | 1 | 1 | 1 |
| Total film thickness (μm) (dry) | 28 | 26 | 26 | 19 | 19 |
| Pencil hardness H | H | H | H | F | H |
| Buchholz hardness | 155 | 155 | 156 | 126 | 132 |
| MEK double rubbing test | >100 | >100 | >100 | >30 | >100 |
| Tape test | 2.0/0 | 2.0/0 | 2.5/0 | 2.0/0 | 2.0/0 |
| Aging (180° C., 30 min.) | 2.0/0 | 2.0/0 | 2.5/0 | 2.0/0 | 2.0/0 |
| Surface Coin test | good | good | good | good | good |
| substrate adhesion | v.good | v.good | v.good | v.good | v.good |
| intercoat adhesion | v.good | v.good | v.good | — | — |

*Baking period and object temperature the same as for primer.

The following tests have been carried out on Granodine C108 sheets coated with primer 1 and topcoat 1:

Salt spray test (DIN 50021): No undermigration was visible at the scratch after 480 hours.

Condensed water cycling test in an atmosphere containing $SO_2$ (SFW 0.25) (DIN 50018): Over a period of 240 hours only slight matting was observed.

Condensed water cycling test (DIN 50017, 240 hours): No blisters or cracks.

Resistance to FAM test fuel (5 minutes' exposure), xylene (5 minutes' exposure), oil and brake fluid (48 hours at room temperature): No changes.

Impact test (2×500 g of chippings, 3 bar): Slight surface damage (about 3–5%), individual perforations.

Long-term aging tests (65 hours, 250° C.) carried out on Allodine 1200 sheets coated with topcoat 1 or with primer 1 and topcoat 1 showed no decrease in adhesion and other characteristics. Also adhesion was not impaired by repeated heating to 250° C.) followed by immersion in cold water.

We claim:

1. A method for coating a metal strip in a coil coating process comprising:
   applying to a metal strip a coating composition based on a polyester imide resin consisting of:
   a) 3 to 50% by weight of a polyester imide resin obtained from:
      (a) a polybase carboxylic acid,
      (b) a polyhydric alcohol, and
      (c) an imide group-containing compound which contains between functional groups as connecting links one or more five-membered imide rings derived from the reaction of (i) pyromellitic dianhydride, trimellitic anhydride, naphthalenetetracarboxylic dianhydride or a tetracarboxylic dianhydride with two benzene nuclei per molecule in which the carboxylic groups are located in the 3,3', 4,4' positions, with (ii) a polyfunctional primary amine.
      such that a 20 to 60% by weight solution of the polyester imide resin has a viscosity in the range from 90 to 4,000 mPas at 23° C. and the hydroxyl value of the polyester imide is from 50 to 330,
   b) 3 to 40% by weight of pigments or fillers,
   c) up to 3% by weight of auxiliary substances and additives selected from the group consisting of silicone oils, waxes, silicates and pyrogenic salicylic acids, and
   d) 10 to 90% by weight of one or more organic solvents,
   the sum of a), b), c) and d) being 100% by weight, and curing the metal strip at an object temperature of from 200° to 350° C. for 30 to 120 seconds in the presence of a suitable catalyst.

2. The method as claimed in claim 1, wherein tris-2-hydroxyethyl isocyanurate is used in the preparation of the polyester imide resin a).

3. The method as claimed in claim 1 wherein the composition is applied as a primer with a dry film thickness of from 4 to 15 μm.

4. A method in accordance with claim 1 wherein the polyester imide resin a) comprises 20 to 40% by weight of the coating composition.

5. A method in accordance with claim 1 wherein the polyhydric alcohol component used in the preparation of the polyester imide resin a) contains a hydroxycarboxylic acid.

6. A method in accordance with claim 1 wherein component b) comprises 10 to 30% by weight of the coating composition.

7. A method in accordance with claim 3 wherein the primer coat has a dry film thickness of from 5 to 10 microns.

8. A method in accordance with claim 3 further comprising:

curing the primer, and applying a topcoat containing the polyester imide resin produced from components a) to d) having a dry film thickness of 5 to 23 μm.

9. A method in accordance with claim 8 wherein the topcoat has a dry film thickness of from 10 to 19 microns.

10. A metal strip produced in accordance with the method of claim 1.

11. The method as claimed in claim 8 wherein the coating material used as the primer contains an anticorrosive pigment and the coating material used as the topcoat contains a metallic pigment.

* * * * *